United States Patent [19]

Zanner, Jr.

[11] 3,712,719

[45] Jan. 23, 1973

[54] PROJECTOR FOR USE WITH MAGAZINES AND REELS FOR MOTION PICTURE FILM

[75] Inventor: Johann Zanner, Jr., 8025 Unterhaching, Germany

[73] Assignee: Agfa-Gevaert Aktiengesellschaft, Leverkusen, Germany

[22] Filed: May 10, 1971

[21] Appl. No.: 141,826

[30] Foreign Application Priority Data

May 21, 1970 Germany.....................P 20 24 637.1

[52] U.S. Cl. ....................352/73, 352/157, 352/158, 242/197
[51] Int. Cl.............................................G03b 23/02
[58] Field of Search ..352/72, 73, 157, 158; 242/197, 242/198

[56] References Cited

UNITED STATES PATENTS

| 3,554,462 | 1/1971 | Bundschuh | 242/197 |
| 3,603,529 | 9/1971 | Bundschuh | 352/72 |
| 3,599,897 | 8/1971 | Wangerin | 352/157 |
| 3,603,527 | 9/1971 | Prelletz | 352/157 |
| 3,552,683 | 1/1971 | Bundschuh et al. | 242/198 |
| 3,337,147 | 8/1967 | Soong et al. | 242/197 |

Primary Examiner—Samuel S. Matthews
Assistant Examiner—Alan A. Mathews
Attorney—Michael S. Striker

[57] ABSTRACT

A motion picture projector wherein the top wall of the housing is provided with an inwardly extending chamber for reception of smaller or larger magazines for motion picture film or for reception of smaller or larger exposed supply reels for motion picture film. The housing contains an automatic threading unit for the leader of motion picture film in a magazine and a manually operated threading unit serving for threading of motion picture film which is stored on an exposed supply reel. The reel can be mounted for rotation in the chamber by moving a mandrel from a retracted position to an extended position in which the mandrel extends through the central opening in the core of the reel. Such movement of the mandrel is utilized to move an obstructing member away from the inlet for manual threading of motion picture film which is stored on a reel.

8 Claims, 4 Drawing Figures

PATENTED JAN 23 1973

3,712,719

INVENTOR
JOHANN ZANNER jun.

INVENTOR
JOHANN ZANNER jun.

PROJECTOR FOR USE WITH MAGAZINES AND REELS FOR MOTION PICTURE FILM

BACKGROUND OF THE INVENTION

The present invention relates to cinematographic apparatus in general, and more particularly to improvements in projectors for motion picture film. Still more particularly, the invention relates to improvements in projectors which can employ magazines for convoluted motion picture film.

SUMMARY OF THE INVENTION

An object of the invention is to provide a motion picture projector which can project images of film frames on motion picture film which is stored in magazines or cassettes as well as of film frames on motion picture film which is stored on conventional exposed supply reels.

Another object of the invention is to provide a motion picture projector which can employ large, medium-sized or small magazines for motion picture film as well as large, medium-sized or small supply reels for motion picture film.

A further object of the invention is to provide a projector which is constructed and assembled in such a way that at least certain magazines can automatically find their way into an optimum position for withdrawal of motion picture film from their interior, which occupies little room in storage or transport, and which can be used with commercially available magazines or supply reels for motion picture film.

An additional object of the invention is to provide the above outlined motion picture projector with novel means for properly mounting supply reels of large, medium or small diameter in an optimum position for transport of film from such supply reels past the gate and to the takeup reel.

Another object of the invention is to provide a versatile motion picture projector for use with magazines or supply reels containing between 15 and 120 meters of convoluted motion picture film.

Still another object of the invention is to provide a motion picture projector which need not have collapsible outwardly extending arms or like parts and which need not be furnished with costly and complicated adapters or accessories which are likely to be lost or misplaced when not in use.

The improved motion picture projector comprises a housing defining a recess or chamber which is preferably open at its top and can receive at least a portion of a magazine or at least a portion of a supply reel for convoluted motion picture film, and bearing means (such as a reciprocable mandrel which can pass through the central opening of the core of a supply reel for motion picture film) mounted in the housing for movement between a first or retracted position (outside of the chamber) and a second or extended position (within the chamber) to thereby rotatably support or mount the supply reel which extends into the chamber. The projector is preferably further provided with an automatic threading unit which is capable of withdrawing the leader of film from the interior of a properly inserted magazine and of advancing the leader along a predetermined path toward the core of the takeup reel.

In accordance with another feature of the invention, the bearing means can actuate one or more adjusting means for one or more camera units which are to be rendered operative or inoperative when the chamber accommodates at least a portion of a supply reel. The arrangement is preferably such that the adjusting means is actuated in automatic response to movement of the bearing means to its first and/or second position.

The novel features which are considered as characteristic of the invention are set forth in particular in the appended claims.

The improved motion picture projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
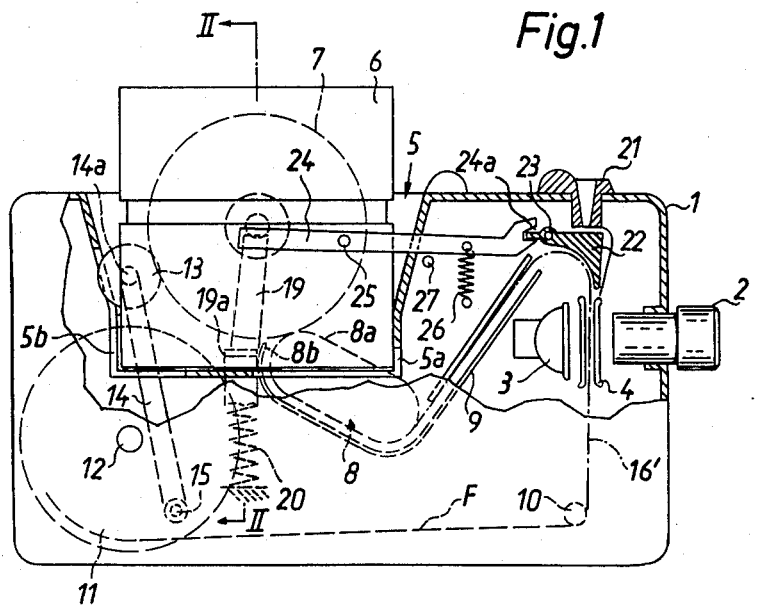
FIG. 1 is a diagrammatic side elevational view of a motion picture projector which embodies the invention, a portion of one side wall of the housing being broken away and the chamber of the housing receiving a portion of a magazine for motion picture film.
Figure 2:
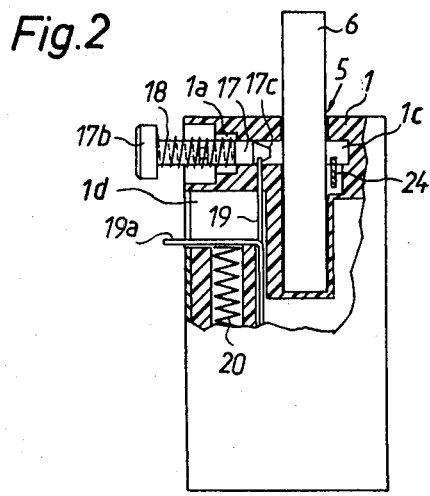
FIG. 2 is a partly front elevational and partly transverse vertical sectional view as seen in the direction of arrows from the line II—II of FIG. 1.

Referring first to FIGS. 1 and 2, there is shown a motion picture projector having a substantially box-shaped housing 1 the front wall of which supports a mount 2 for the projection lens. The mount 2 is located in front of a film gate 4 which is located in front of a reflector 3 partially surrounding a projection lamp (not shown) which directs a beam of light through that film frame which is in registry with the gate 4. The image of such frame is then focussed on a screen, not shown. The top wall of the housing 1 is provided with a longitudinally extending relatively narrow recess or chamber 5 serving as a means for receiving at least a portion of a magazine or cassette 6 (FIGS. 1 and 2) or at least a portion of a reel 16 (FIGS. 3 and 4) for convoluted motion picture film.

The magazine 6 is of known design and contains a rotary supply spool 7 for convoluted motion picture film F. The illustrated magazine 6 is the largest of a set of differently dimensioned magazines which can be used with the projector of the present invention. This magazine is assumed to contain a spool 7 for 120 meters of motion picture film. Other magazines which can be used with the projector normally contain 60 or 15 meters of film. The configuration of the chamber 5 is such that the magazine 6 is received therein in a predetermined optimum position so that an opening (not shown) in its bottom wall registers with a window 5a in the lower part of the chamber 5. A second opening in the lower part of the rear wall of the magazine 6 registers with a second window 5b of the chamber 5.

The opening 5a permits movement of a conventional automatic film threading unit 8 to and from an operative position in which the unit 8 not only rotates the spool 7 or the outermost convolution of film F on the spool 7 in a direction to pay out the film but also deflects the leader of the outermost convolution into a predetermined path so that the leader advances in a guide channel 9, thereupon in front of the gate 4, around a guide roll 10 and toward the core of a takeup reel 11 which is mounted in the housing 1 for rotation about the axis of a spindle 12. The latter can be driven by the motor (not shown) of the projector to collect the film which is being drawn from the spool 7 in the properly inserted magazine 6. The projector comprises a customary claw pull-down (not shown) which is also driven by the aforementioned motor and serves to place successive frames of the film F into registry with the gate 4 when the projector is in use to project the images of successive frames onto a screen or the like. The automatic film threading unit 8 comprises an endless belt 8a which can be driven when it extends through the window 5a and through the respective opening of the magazine 6 to engage the outermost convolution of film F on the spool 7, and a deflector 8b which engages the outermost convolution in front of the belt 8a to direct the leader of the film into the channel 9. The leader is automatically coupled to the core of the take-up reel. The operation of the automatic threading unit 8 can be terminated (i.e., the belt 8a and the deflector 8b can be withdrawn from the magazine 6 and into the interior of the housing 1) as soon as the leader of film F reaches the claw of the aforementioned pull-down because the pull-down then takes over the transport of film toward and into engagement with the core of the takeup reel 11.

When the projection of images of frames on the film F is terminated, the film can be rewound onto the spool 7 in the magazine 6 by a rewinding unit which preferably includes a friction wheel 13 mounted on the shaft 14a of an arm 14 which is pivotable on a pin 15 of the housing 1. The friction wheel 13 can be pivoted by the lever 14 through the window 5b and through the corresponding opening of the magazine 6 to engage the spool 7 or the convoluted film on the core of the spool and to rotate the spool in a direction to collect the film. The friction wheel 13 can be moved to its operative position in automatic response to tensioning of the trailing portion of the film, i.e., in response to continued rotation of the takeup reel 11 in a clockwise direction, as viewed in FIG. 1, after the major part of the film is already convoluted onto the core of the reel 11. The leader of the film F is automatically detached from the takeup reel 11 during rewinding and the cassette 6 can be withdrawn from the chamber 5 as soon as the leader returns into the casing of the magazine.

The chamber 5 is open at its top and is flanked by front and rear walls which are respectively provided with the aforementioned windows 5a, 5b and have upper portions which slope downwardly toward each other to guide the magazine 6 into an optimum position in which the spool 7 is in the range of the automatic threading unit 8 and of the automatic rewinding unit including the friction wheel 13.

The configuration of the chamber 5 is such that it can also receive larger, medium-sized or smaller supply reels 16 (FIGS. 3 and 4) for motion picture film F. The illustrated reel 16 is relatively small; it is assumed to carry 25 or 60 meters of convoluted film. However, the chamber 5 is large enough to receive a portion of a larger reel which can contain 120 meters of motion picture film.

Figure 3:
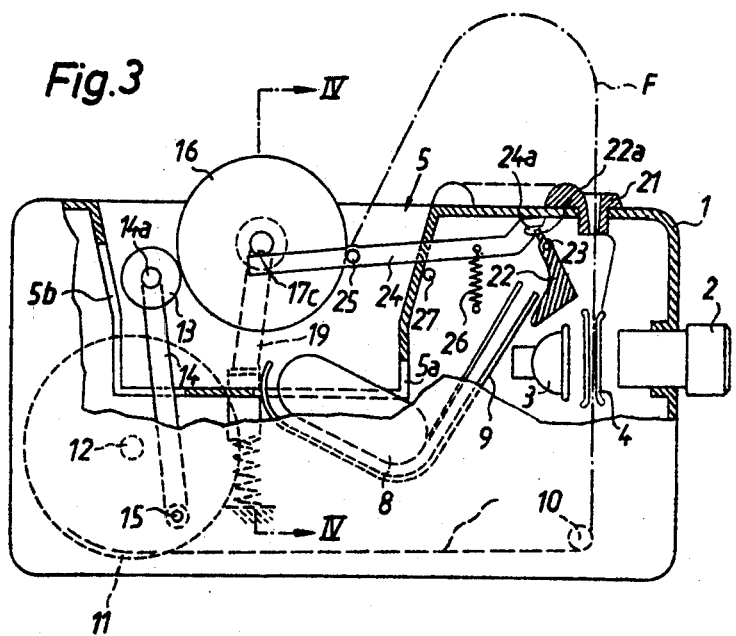
FIG. 3 illustrates the projector in the view of FIG. 1 but with the magazine replaced by a supply reel for motion picture film.
Figure 4:
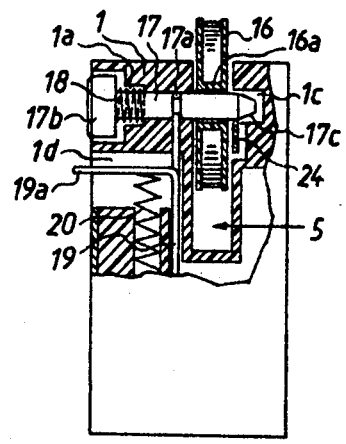
FIG. 4 is a rear elevational and partly transverse vertical sectional view as seen in the direction of arrows from the line IV—IV of FIG. 3.

In order to insure proper mounting and centering of the supply reel 16, the projector comprises a bearing member in the form of a mandrel 17 which is movable between a first or retracted position shown in FIG. 2 and a second or extended position shown in FIG. 4. A helical spring 18 surrounds a portion of the mandrel 17 and urges it permanently to the first position of FIG. 2 in which the conical tip 17c at the forward end of the mandrel is located outside of the chamber 5. The mandrel is reciprocable in a transversely extending bore or hole 1a of the housing 1 and has at its outer end a handgrip portion or knob 17b which can be depressed against the opposition of the spring 18. The tip 17c can pass through the central opening 16a in the core of the reel 16 and thereupon extends into a bore of hole 1c provided in the housing 1 at the opposite side of the chamber 5 in registry with the hole 1a. If the reel 16 is relatively small (as shown in FIGS. 3 and 4) its flanges must be held by hand during introduction of the tip 17c into the opening 16a. Once the tip 17c extends into the hole 1c, the reel 16 is properly centered in the chamber 5 and the leader of the film F thereon can be threaded through the projector to be attached to the core of the takeup reel 11.

The housing 1 further accommodates a blocking member 19 which is biased upwardly, as viewed in the drawing, by a helical spring 20 and the upper end portion of which can extend into a circumferential groove 17a of the mandrel 17 to releasably hold the mandrel in the second position shown in FIG. 4, i.e., to prevent the mandrel from returning to the first position of FIG. 2 under the action of the spring 18. The blocking member 19 has a handle 19a which extends from a slot 1d of the projector housing 1 and can be depressed by a finger in a downward direction, as viewed in FIG. 4, to disengage the member 19 from the groove 17a whereby the mandrel 17 automatically reassumes the first position of FIG. 2 under the action of the spring 18.

Projectors of the class to which the projector of FIGS. 1 to 4 belongs normally comprise two threading units, namely, an automatic threading unit (8) for motion picture film which is to be withdrawn from a magazine 6, and a second threading unit through which the film stored on a reel 16, is to be guided to reach the aforementioned claw pull-down which takes over the transport of the leader of film toward the core of the takeup reel 11. In the illustrated embodiment, the second threading unit comprises an inlet or mouth 21 which is provided in the top wall of the housing 1 in front of the open upper end of the chamber 5 and through which the leader of film F can be introduced by hand to pass in front of the gate 4 and into the range of the claw of the pull-down. The latter then advances the leader of film F around the guide roll 10 and toward the core of the reel 11.

The introduction of the leader of film F through and beyond the mount 21 is normally prevented by a closure or cover 22 which is pivotable in the housing 1 on a horizontal pin 23 and is normally held in registry with the inner end of the mount 21 by a two-armed adjusting lever 24. The lever 24 is pivotable in the housing 1 on a pin 25 and is biased in a clockwise direction, as viewed in FIG. 1, by a helical spring 26 which urges the right-hand arm of the lever 24 against a fixed stop 27. The end portion 24a of the right-hand arm of the adjusting lever 24 is bifurcated and its prongs flank a projection 22a of the closure 22 which is held in the position of FIG. 1 when the chamber 5 is empty or accommodates a portion of a magazine 6 or accommodates a portion of a reel 16 provided that the mandrel 17 is held in the first position shown in FIG. 2. The left-hand arm of the adjusting lever 24 extends into the path of the conical tip 17c on the mandrel 17 and is pivoted by the tip 17c when the mandrel 17 moves toward the position of FIG. 4 (namely, when the tip 17c moves into the hole 1c) to thereby pivot the adjusting lever 24 in a counter-clockwise direction, as viewed in FIG. 1. The lever 24 then pivots the closure 22 on the pin 23 and moves it to the position of FIG. 3 in which the leader of film F can be introduced through and beyond the mouth 21 so as to advance into the range of the claw pull-down. In the position of FIG. 1, a concave surface of the closure 22 serves to direct the film into the channel 9.

The operator of the projector depresses the handle 19a of the blocking lever 19 only when the film F is again convoluted on the core of the supply reel 16. The spring 18 then returns the mandrel 17 to the position of FIG. 2 and the tip 17c moves away from the adjacent arm of the adjusting lever 24. The spring 26 is free to pivot the lever 24 in a clockwise direction (from the position of FIG. 3 to the position of FIG. 1) whereby the closure 22 returns into registry with the inner end of the mouth 21. Thus, the second threading unit including the mouth 21 is rendered operative in response to movement of the mandrel 17 into the chamber 5 to properly mount a reel 16 for rotation with reference to the housing 1.

An advantage of the adjusting lever 24 is that the user of the projector need not be concerned with the position of the closure 22. This closure is automatically held in the position of FIG. 1 when the supply reel 16 is removed from the chamber 5 because such removal necessitates the movement of mandrel 17 to the position of FIG. 2, i.e., to a position in which the spring 26 is free to return the closure 22 to the position of FIG. 1 in which the passage defined by the mouth 21 cannot admit dust, moisture or other foreign matter. On the other hand, the closure 22 automatically moves to the position of FIG. 3 when the supply reel 16 is properly mounted for rotation with reference to the housing 1 because the conical tip 17c of the mandrel 17 then stresses the spring 26 and the bifurcated end portion 24a of the longer arm of the lever 24 holds the closure 22 in the position of FIG. 3.

The provision of two threading units is desirable especially if the projector is to be used with relatively small supply reels as well as with medium-sized and large reels. As a rule, an automatic threading unit (such as the unit 8) is not suited for withdrawal of film from a reel, particularly from a relatively small reel. However, it is within the purview of the invention to provide the projector with a threading unit which can withdraw the leader of motion picture film from a magazine and which can also withdraw the leader of motion picture film from the space between the flanges of an exposed supply reel, such as the reel 16 of FIGS. 3 and 4.

It is clear that the adjusting lever 24 can be operatively connected with two or more projector units which have parts to be moved into operative positions in response to proper mounting of a supply reel 16, i.e., in response to movement of the mandrel 17 to the position shown in FIG. 4. It is equally within the purview of the invention to provide two or more discrete adjusting members each of which receives motion from the mandrel 17 and serves to move one or more parts in a unit of the projector, namely, a unit which must be rendered operative or inoperative when the projector is to project images of frames on a film which is being withdrawn from a supply reel (such as the reel 16) rather than from the interior of a magazine or cassette. For example, the adjusting lever 24 or a separate adjusting lever can arrest and hold in retracted position the automatic threading unit 8 in response to penetration of the tip 17c of the mandrel 17 into the hole 1c of the housing 1 or in response to upward movement of the blocking lever 19 under the action of the spring 20.

An important advantage of the improved projector is that it need not have any outwardly extending arms for supply and/or takeup reels, i.e., that the projector occupies little room, especially when the chamber 5 is empty. Furthermore, the projector need not utilize any loose or separable adapters or other accessories which are likely to be lost or misplaced when not in use. Thus, the closure 22 need not be detached in order to permit introduction of the leader of film F through and beyond the mouth 21.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a motion picture projector for use with film-containing magazines and film-containing reels, a combination comprising a housing defining a chamber dimensioned to receive at least a portion of any one of a range of differently dimensioned magazines and any one of a range of differently dimensioned reels; and bearing means mounted and confined in said housing for axial movement between a first position outside of said chamber to thus allow for insertion of at least a portion of a selected one of said range of magazines into said chamber and a second position within said chamber to thereby rotatably support a selected reel.

2. In a motion picture projector for use with film containing magazines and film containing reels, a combination comprising a housing defining a chamber for reception of at least a portion of a magazine or reel; bearing means mounted in said housing for movement between a first position outside of said chamber and a second position within said chamber to thereby rotatably support a reel; a film threading unit which is in use during projection of images on a film which is being withdrawn from a reel in said chamber, said unit having an inlet for motion picture film which is being withdrawn from a reel in said chamber and a closure movable into and out of register with said inlet; and adjusting means for moving said closure out of register with said inlet in response to movement of said bearing means to said second position thereof.

3. A combination as defined in claim 2, further comprising a second film threading unit movable in said housing to and from an operative position and including means for withdrawing motion picture film from a magazine in said chamber in the operative position of said second unit.

4. A combination as defined in claim 3, further comprising a takeup reel rotatably mounted in said housing, said first mentioned threading unit being arranged to guide the film for movement from a selected reel in said chamber toward said takeup reel and said second threading unit being arranged to guide the film for movement from a selected magazine in said chamber toward said takeup reel.

5. A combination as defined in claim 2 wherein said chamber is arranged to receive reels of the type having a core provided with an opening, said bearing means comprising a mandrel which is reciprocable in said housing and extends into said opening of a reel in said chamber in said second position of said bearing means.

6. A combination as defined in claim 2, further comprising biasing means for permanently urging said bearing means to one of said positions.

7. A combination as defined in claim 6, further comprising spring-biased blocking means arranged to block the movement of said bearing means from the other position thereof and means for disengaging said blocking means from said bearing means to permit movement of said bearing means to said one position under the action of said biasing means.

8. A combination as defined in claim 2, wherein said chamber has an open top so that a magazine or reel can be dropped into said chamber.

* * * * *